United States Patent [19]

Flory

[11] Patent Number: 4,915,851

[45] Date of Patent: Apr. 10, 1990

[54] CLARIFYING FILTER-CENTRIFUGE AND METHOD OF FILTERING SUSPENSIONS

[75] Inventor: Wilfried Flory, Brühl, Fed. Rep. of Germany

[73] Assignee: DRM. Dr. Müller AG, Männedorf, Switzerland

[21] Appl. No.: 237,996

[22] Filed: Aug. 29, 1988

Related U.S. Application Data

[62] Division of Ser. No. 906,920, Sep. 11, 1986, Pat. No. 4,808,308.

[30] Foreign Application Priority Data

Sep. 16, 1985 [CH] Switzerland .................... 4005/85-4

[51] Int. Cl.$^{4}$ .......................... B04B 7/16; B04B 3/00; B04B 11/00; B01D 33/02

[52] U.S. Cl. .................................... 210/781; 494/37

[58] Field of Search ............... 210/781, 366, 369, 372, 210/376, 377, 380.1, 370, 380.3, 787; 494/37, 36, 64; 127/56, 19

[56] References Cited

U.S. PATENT DOCUMENTS

| | | | |
|---|---|---|---|
| 934,221 | 9/1909 | Schmitz | 210/370 |
| 1,292,758 | 1/1919 | Gonzalez | 210/377 |
| 3,087,621 | 4/1963 | Gooch | 210/376 |
| 3,438,500 | 4/1969 | Pico | 210/370 |
| 3,884,806 | 5/1975 | Coughlin et al. | 210/781 |
| 4,269,711 | 5/1981 | Gerteis | 210/370 |
| 4,612,126 | 9/1986 | Alt et al. | 210/787 |

FOREIGN PATENT DOCUMENTS

| | | | |
|---|---|---|---|
| 1272229 | 7/1968 | Fed. Rep. of Germany . | |
| 3238728 | 8/1983 | Fed. Rep. of Germany | 494/36 |
| 1362722 | 4/1964 | France . | |
| 183673 | 6/1966 | U.S.S.R. | 494/36 |
| 1044338 | 9/1983 | U.S.S.R. | 494/36 |
| 1027293 | 4/1966 | United Kingdom . | |

*Primary Examiner*—W. Gary Jones
*Assistant Examiner*—Matthew O. Savage
*Attorney, Agent, or Firm*—Michael J. Striker

[57] ABSTRACT

A clarifying filter-centrifuge comprises a rotatable driving shaft, a closed drum driven by the shaft, a cover which closes the drum at an end face thereof, and a filter diaphragm mounted in the cover and extending normal to an axis of rotation of the shaft. The drum includes an outer sleeve and an inner sleeve coaxial with the outer sleeve and having a thrust body. The driving shaft includes a hollow shaft and an inner shaft axially displaceable in the hollow shaft. The drum is connected to the hollow shaft. Suspension is fed axially into the inner sleeve and flows through distributing channels into the interior of the outer sleeve and then through the filter diaphragm. The cover is displaceable for discharging separated solids from the centrifuge.

2 Claims, 5 Drawing Sheets

CLARIFYING FILTER-CENTRIFUGE AND METHOD OF FILTERING SUSPENSIONS

This is a division of application Ser. No. 906,920, filed Sept. 11, 1986, now U.S. Pat. No. 4,808,308.

BACKGROUND OF THE INVENTION

The present invention relates to a clarifying filter centrifuge of the type including an enclosed drum driven by a driving shaft, and a filter means positioned in a cover of the centrifuge and extending perpendicular to the axis of the driving shaft, and to a method of separating or filtering suspensions by means of said centrifuge.

There are two types of conventional centrifuges for filtering suspensions, namely solid jacket centrifuges and filter centrifuges.

Solid jacket centrifuges are utilized preferably for clarifying liquids. The heavy phase is deposited and collected on the wall of the drum while the light phase of the liquid, which is also a liquid, flows through an overflow weir.

In filter centrifuges, the liquid flows through filter cakes and filter means. This type of centrifuge is normally applied for dehumidizing well-filtered pumps.

The specific characteristic of the clarifying filter-centrifuge resides in that the suspension is not only silted there but is also filtered. If it is desired to treat a solid-free material, for example in case of solvent agent recovery and if the suspension are not well filtered, the application of the clarifying filter centrifuge is preferable, specifically when flocculation means are undesired due to their costs or when these means affect the following chemical process.

German Offenlegungsschrift DE-OS No. 32 38 728 discloses a centrifuge for difficulty filterable suspensions. The filtering process is carried out under superimposing of the other separation methods. The separation of the liquid from the solids is performed by the sedimentation and filtration. The centrifuge is comprised substantially of two preferably parallel plate-shaped members rigidly connected to each other and extending normal to the axis of rotation. The peripheries of these members are closed with a tubular body so that a hollow chamber for receiving a suspension to be processed is formed.

For the removal of the solids the hollow chamber is opened by the displacement of the tubular body. The separating insert which is comprised of a diaphragm, which is connected to a supporting element by a conical ring is perpendicular to the rotation axis and is secured to a ring-shaped front wall of the centrifuge chamber. The ring-shaped front wall is connected to the back wall of the chamber by three bolts inserted in protective sleeves. The suspension flows via an inlet tube to a distributor cone which accelerates suspension and leads the same to the back wall. The suspension is fed into the centrifuge until the liquid level has reached the bolts. The displacement of the solid jacket or the sleeve for the unloading of solids from the centrifuge is carried out by a pneumatic cylinder which transmits a displacement force of a system operated outside to a rotating system via ball bearings. Also, a force which is required to lock up the centrifuge while the centrifuge is operating is applied by that cylinder. Another version utilizes vacuum and pressure air which are supplied via the centrifuge shaft between the back wall of the chamber and drum body for the closing or opening of the centrifuge.

The disadvantages of this conventional centrifuge are as follows:

The centrifuge chamber is, at the location of the seal between the drum and the cover, subjected to the action of a small centrifugal forces, and if the sealing of the centrifuge is not tight enough the suspension liquid flows into the solid material and the separation material becomes moist.

Further, during the high-speed centrifugal process the relatively high force for locking applied via the ball bearings leads to failure of the ball bearings.

The conical shape of the clamping ring of the filter means leads to folding of the filter means whereby the filter means can no longer be reliably stretched.

The clamping of the filter means is not suitable to various thicknesses of the filter means because the clamping and the diaphragm rings must be precisely adjusted.

If, due to manufacture tolerances of the clamping ring and diaphragm ring and manufacture tolerances of the thickness of the filter means, the diaphragm ring is not precisely positioned on the membrane this would cause leakage at the worn-off places between the drum and the cover of the centrifuge.

Due to wear it has been required that sealings between the wall of the chamber of the centrifuge and drum sleeve be non-tight so that suspension would penetrate the chamber between the back wall of the centrifuge and the bottom wall of the drum which, on the one hand, was prevented by leakage of vacuum pressure for the centrifugal process and, on the other hand, caused the formation of radiation nests during the filtering of radio-active suspensions. Furthermore, this undesired breakoff during filtering of suspension which contain ferments or the like materials causes non-desired residues to be deposited in the centrifuge chamber which would require dismanteling and cleaning of the centrifuge.

Sealing materials and shapes utilized in conventional centrifuges of the type under discussion are not suitable for sealing pharmaceutical, life-supporting, radiation-active or chemically aggressive suspensions. They are also unsuitable with high pressures which occur due to liquid pressure of suspensions treated at high speeds.

Metal components utilized in such centrifuges are not sufficiently stable for filtering radioactive or chemically aggressive suspensions.

Therefore for unloading solids obtained in a centrifuging process the drum is displaced, and an enlarged projecting length of the driving shaft between the bearing and the drum bottom wall is obtained over the drum displacement path, which affects center of mass of the protruding components such as the drum chamber walls. Centrifugal materials are affected by unfavorable bearing loads or shaft loads and critical speeds so that high speeds can not be adjusted to filtering of heavier materials The overflow is not separated from the clarified suspension, and during the overfilling of the centrifuge it causes contamination of the filtrate.

The liquid and solid amounts in the centrifuge are visually controlled by operators, this however is non-allowable when radioactive or toxic suspensions are treated.

The housing of the centrifuge is open for feeding the suspension thereinto so that processing of the radiation-active or toxic suspensions leads to affecting the personnel and the environment.

The machine must be manually controlled during its entire operation cycle which is undesired specifically with radioactive suspensions.

SUMMARY OF THE INVENTION

It is an object of the present invention to provide an improved clarifying filter-centrifuge for filtering difficulty filterable solids from suspensions.

It is a further object of the invention to provide a centrifuge in which solids would be fully separated from suspensions so that an optically clear liquid would be obtained and the lowest moisture content would be produced in the separated solids.

Yet another object of the present invention is to provide a modified clarifying filter-centrifuge which would be suitable for filtering the suspension with high response to physiological harmlessness, and which would have chemical stability against aggressive agents and stability against radiation of products processed in the centrifuge.

Still another object of the invention is to provide a modified centrifuge which can be adjusted to operation with higher speeds and longer drums to filter difficulty filterable suspensions.

A further object of the invention is to provide a centrifuge in which the entire operation cycle can be made automatic.

These and other objects of the invention are attained by a clarifying-filter centrifuge, comprising a rotatable driving shaft; a closed drum driven by said shaft; a cover closing said drum at an end face thereof; filter means mounted in said cover and extending normal to an axis of rotation of said shaft, said drum including an outer sleeve and an inner sleeve coaxial with said outer sleeve and having a thrust body; said driving shaft including a hollow shaft and an inner shaft axially displaceable in said hollow shaft, said drum being connected to said hollow shaft.

It is advantageous that the outer drum sleeve is connected to the hollow shaft which is supported in suitable bearings, preferably roller bearings. Due to the connection of the outer sleeve, a shorter distance is obtained between the center of gravity of the drum and the bearing, whereby favorable shaft loading, bearing loading, higher critical speeds with the same diameter of the shaft are obtained, and the machine can be operated with higher speeds. This leads to the fact that difficulty separable suspensions can be processed in the centrifuge, and smaller particles can be filtered in a shorter time, and a lower remaining moisture can be obtained in a sediment.

The inner shaft can be axially displaceable in the outer hollow shaft by a co-rotational linear drive preferably a hydraulic cylinder, whereby a required force to lock up the centrifuge chamber is produced between the cover and the outer drum sleeve. The support of the centrifuge is not loaded with the force for locking up the centrifuge because it is generated in the rotational system. Furthermore higher sealing forces between the cover and the outer sleeve can be generated, which leads to higher speeds of the centrifuge, better and quicker sedimentation and lower moisture in the filtered product. The centrifuge ensures a better sealing.

Due to the fact that the inner sleeve is coaxial with the outer sleeve and is mounted in the latter the suspension being processed is firstly made compact in the inner sleeve and is accelerated so that fine particles can form a larger agglomerate whereby the entire output of the centrifuge will be improved.

The sealing element for sealing between the outer sleeve and the cover is protected by a radially inwardly projecting nose so that the place of sealing is protected for a long time against cakes to be deposited thereon, and thus a more durable function of the sealing is ensured.

The filter means may be mounted between the thrust body and the cover so that greater amounts of suspension can be filtered for the same time unit.

The filter means can be clamped either in the cover or in the thrust body and can have various thicknesses. The filter means can be clamped, by means of elastic compensating elements preferably of elastic plastic, in clamping rings. The clamping may be carried out so that holding of the clamping means be precluded.

The the inner sleeve may be an extension of said hollow shaft.

The thrust body may be positioned between said outer sleeve and said inner sleeve. At least one pulling rod may be connected to said thrust body to axially move the same telescopically relative to said hollow shaft.

The drum may have a bottom wall, said pulling rod being connected to said bottom wall and being guided through a bore in said thrust body.

The centrifuge may include a feeding hopper concentrically mounted in said inner sleeve and having a free end rigidly connected to said inner sleeve.

A rinsing liquid is supplied into the chamber between the thrust body and the bottom wall of the drum. An intake channel and intake bores are formed in the back wall of the drum at which the cake deposits and activity nests can be rinsed off by the rinsing liquid sealings may be formed of PTFE or fluorized elastomer to adjust to requirements of filtering chemically high aggressive or radioactive suspensions.

The metal components of the centrifuge are made, preferably of plated steel or alloys suitable for chemically aggressive or radiation-active suspensions.

The thrust body may have overflow openings through which the overflow of the suspension being treated can flow, whereby the overflow is discharged from the housing and returned back to a supply line. Preferably the chamber between the thrust body and the bottom wall of the drum can be rinsed by supplying thereinto a rinsing liquid.

The overflow openings can be alternatively provided in the cover of the centrifuge and the overflow can be led to a special overflow chamber and conveyed back to the feeding line. The intermixing of the overflow with the separate solids is prevented.

A pressure-resistant slide ring can be provided for sealing between the housing and the drum, which would prevent escaping of toxic and radioactive materials into the environment.

By the mass or volume compensation between the suspension and the filtrate or by the control of the overflow by suitable control devices, the filling and emptying of the centrifuge can be made automatic.

The inner sleeve may include a flange and the pulling rod may have a flange which limit a free path of said cover.

The inner sleeve has an outer periphery which at least at a part of its length may form an axially displaceable guidance for said cover.

A feeding hopper of the centrifuge may include an outer periphery which at least at a part of its length may form an axially displaceable guidance for said inner shaft and is supported in a bore of said inner drum.

The inner sleeve may be conically enlarged over at least a part of a length thereof in the direction towards said bottom wall.

The inner drum may include a distributing channel.

The thrust body may include a distributing opening and a conduit arrangement in the region of said distributing opening, said distributing opening being positioned between said conduit arrangement and a side of said thrust body facing said cover.

The sealing element between the outer sleeve of the drum and the cover may include an edge directed towards said cover and exactly coinciding with an overflow edge of said outer sleeve.

The thrust body may include an annular chamber.

The filter means may be a diaphragm from 0.2 to 3 mm thick.

The bottom wall of the drum may include an annular intake channel and at least one radial bore on the region of said intake channel.

A conduit arrangement may be mounted in the region of the feeding, and thus a uniform distribution of the suspension treated in the centrifuge is obtained so that imbalance due to a non-uniform loading is prevented as well as the immersion of the suspension into the solid material with a centrifugal stream return.

Advantageously, the cover and the thrust body are connected to the inner sleeve of the drum which is connected to the axially displaceable inner shaft. The cover, the thrust body and the inner sleeve form a very stiff stable unit. The cover carries a ring-shaped filter means which is connected by means of clamping rings and elastic compensating elements on a support ring with the chamber for receiving the filtrate and protecting ribs for protecting annular protecting elements on which the filter means is flatly clamped.

The shape, material and porosity of the filter means may be adjusted to a suspension being filtered.

The aforementioned pulling rod secured to the bottom wall of the drum may be guided through openings in the thrust body and the cover. Upon the displacement of the thrust body with the inner sleeve for discharging the sediment the cover is moved only to the flange of the pulling rod. The cover preferably opens also with greater lengths of the drums as necessary for the removal of the sediment. This leads to a very short intake chamber for the sediment and to lower displaceable masses and also offers a sufficient stability at higher speeds.

A clamping element, preferably a ring of elastomers with suitable high friction properties is inserted in the bore of the cover and serves the purpose of taking along the cover by friction during the movement of the thrust body. Stripping means can be provided in the aforementioned bore to prevent dirt from depositing on the periphery of the inner sleeve or the pulling rod. A number of pulling rods, circumferentially spaced from each other, may be provided in the centrifuge.

The housing of the centrifuge may be pressure-tight sealed up to pressure differences of 3 bar.

The filter means may be a flat or conical diaphragm.

Further the objects of the invention can be attained by a method of filtering suspensions by means of a clarifying filter-centrifuge of the type having a drum with an outer sleeve and an inner sleeve axially displaceable by a driving shaft, a thrust body with distributing channels, and a filter means extending normal to an axis of the driving shaft, the method comprising supplying a suspension axially into said drum by feeding the suspension into said inner sleeves, separating and accelerating the suspension in said inner sleeve, feeding the suspension through said distributing channels into an interior of said outer sleeve wherein said suspension is axially deflected in the direction of said filter means whereby a suspension liquid flows through said filter means and is discharged through discharge openings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
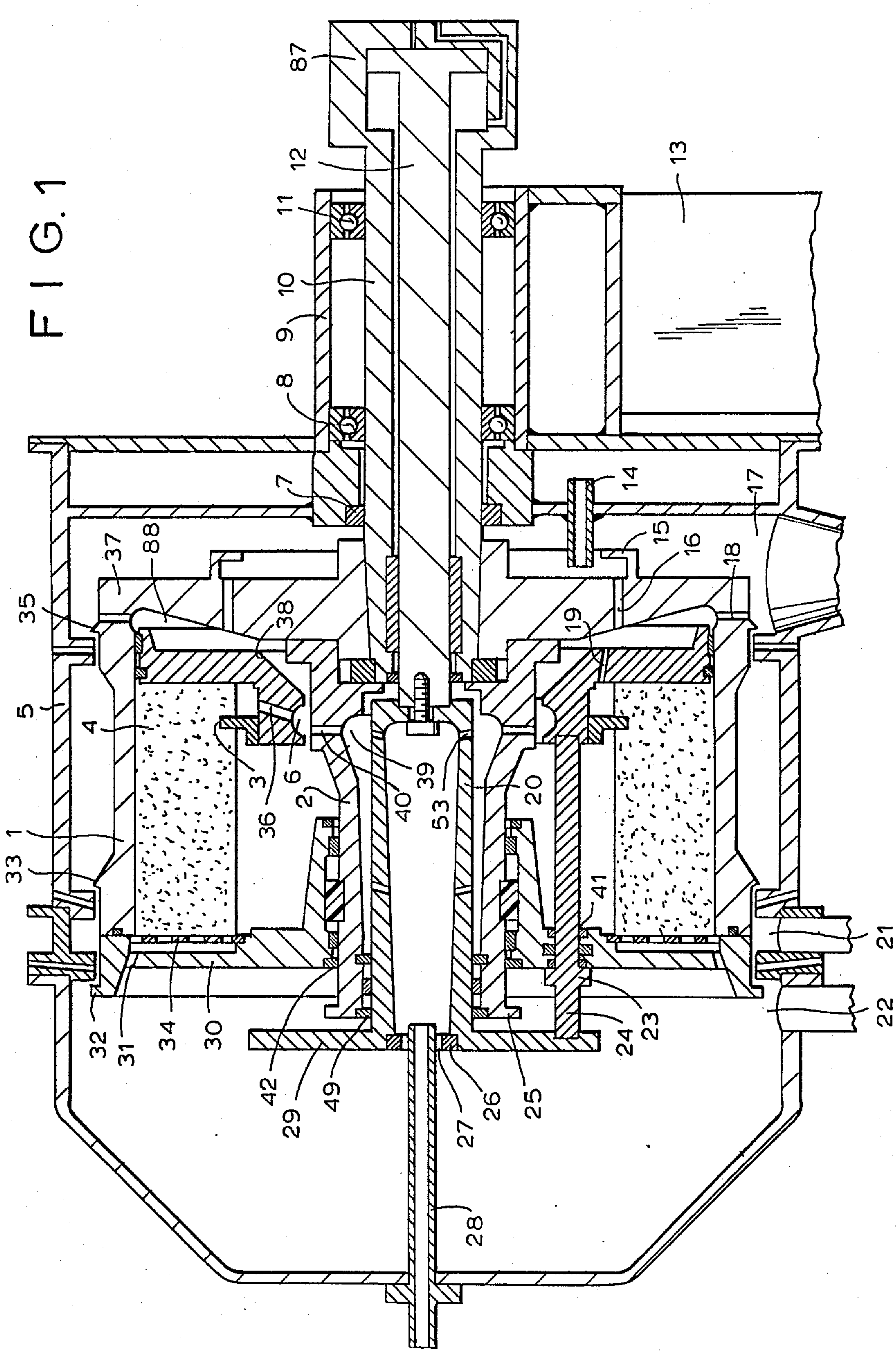
FIG. 1 is an axial sectional view of the clarifying filter-centrifuge according to a first embodiment of the invention

Referring now to the drawings in detail, and firstly to FIG. 1 thereof, it will be seen that the clarifying filter-centrifuge according to the invention includes a housing 5, and a drum having an outer sleeve 1 and an inner drum sleeve 2 rigidly connected to a drum bottom wall 37. The outer drum 1 has at the housing wall a spray nose 33. The inner drum sleeve 2 is guided through a bore 42 in a cover 30 and has a flange 25 which limits the path of the cover 30 during the opening. A thrust body 38 is connected to a pulling rod 24 which is guided through a bore 41 formed in cover 30 and is connected to a flange 29. Reference numeral 13 designates the base on which the centrifuge is installed.

Reference numeral 9 designates a frame welded to housing 5 and supporting in bearings 11 a hollow shaft 10.

The pulling rod 24 has a flange 23 which transmits the centrifugal force to the cover 30 during the closing. Flange 29 is connected to a feeding hopper 20 which in turn is connected to an axially displaceable inner shaft 12, by which the closing movement of the cover 30 or the displacement of the thrust body 38 is carried out by a co-rotational linear drive 87. The feeding hopper is arranged in a bore 49 of the inner drum sleeve 2. The feeding hopper 20 has at a free end thereof a bore 27 accommodating a ring 26 through which a feeding tube 28 extends into the interior of the feeding hopper 20. The diameter of bore 27 is adjustable, by exchanging rings 26, to the outer diameter of the feeding tube 28 whereby the sealing effect of a play between hopper 20 and feeding tube 28 can be regulated and the amount of gas which flows due to ventilation effect of the centrifuge, through the interior of the centrifuge, can be adjusted to respective goods being treated in the centrifuge.

Figure 8:
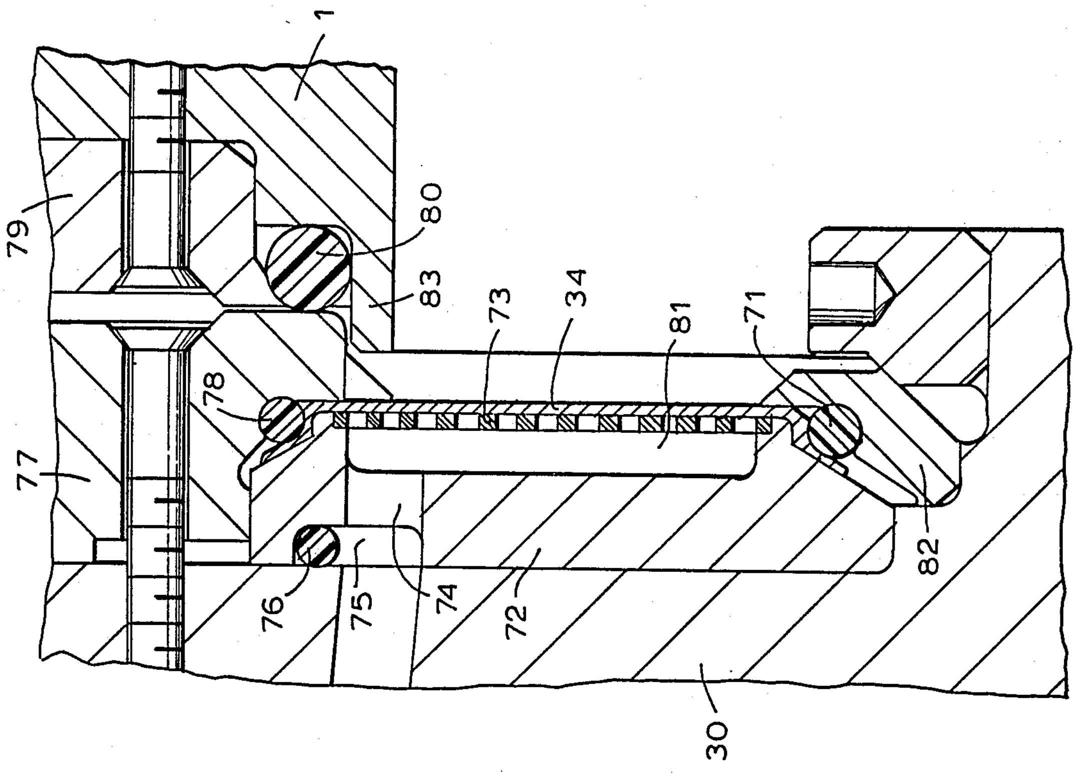
FIG. 8 is a sectional view showing a connection of a filter means to the cover.

Cover 30 has an annular filter means 34 which can be a filter membrane shown in detail in FIG. 8. The thrust body 38 has in the region of distribution openings 36, a conduit arrangement 3. The suspension to be filtered flows through the feeding tube 28 into the feeding hopper 20 and from thence through bores 53 into the inner drum sleeve 2 where the suspension is pre-condensed and pre-centrifuged. Then the suspension being filtered flows from inner drum sleeve 2 through a distributing channel 39 and distributing openings 40 into an intake passage 6 in the thrust body 38 and via distributing openings 36 where it is centrifuged, to the conduit arrangement 3. Here the suspension is divided and deflected to the filter means 34. At its path towards the filter means 34, a portion of solids settles out. The suspension liquid flows through the filter medium 34 and enters openings 31 and is centrifuged at a nose or projection 32 provided on the cover 30. The filtrate is collected and drained off in an intake chamber 22. The solids contained in the suspension liquid are held on the filter means 34. If there is too much suspension it flows through openings 19 into the thrust body 38 and through that body into a chamber 88. The overflow of the suspension flows through bores 18 in a bottom wall 37 of the drum and is accelerated at a deflecting nose or projection 35 into the intake chamber 17 from which it is returned to an inlet. Residue of the suspension stuck in the chamber 88 is rinsed out from the chamber by rinsing with a rinsing liquid preferably clarified filtrate. For this purpose, the rinsing liquid is supplied through a conduit 14 into an intake gutter 15 from which this liquid flows through bores 16 into chamber 88; the latter is rinsed by the liquid which is then forced together with the residues through bores 18 into the intake chamber 17. In case if the filtrate is utilized for rinsing the chamber 88 the contaminated rinsing liquid is conveyed from the intake chamber directly to the feeding part of the centrifuge.

When the space within the outer drum sleeve between the cover 30 and the thrust body 38 is filled with sediment 4 to a permissible level or the suspension is no longer available the supply of suspension is shut down and sediment 4 is centrifuged dry for a selected period of time. After the dry centrifuging has been completed the linear drive 87, preferably a hydraulic drive moves the inner shaft 12 and thereby, via the pulling rod 24, the thrust body 38 in the direction towards the free end of the outer drum sleeve 1. If a sufficient amount of sediment 4 is available it presses right against the cover 30 which thereby opens. In the case if a very little amount of sediment is contained in the centrifuge clamping elements which will be described below in connection with FIG. 5, ensure that the cover 30 opens to some degree unless it strikes against flange 25. The sediment 4 thereby is shifted and is forced into the intake chamber 21 in the housing 5. If the centrifuging process is carried out with a full speed a prevailing centrifuge field completely cleans the filter means 34 in the cover 30. By a suitable adjustment of the stroke of the thrust body it is provided that sediment 4 is completely removed from the centrifuge.

The individual intake chambers 17, 21 and 22 for the filtrate, sediment and over flow or rinsing liquid are separated from each other by suitable sealings, preferably split sealings with a blocking gas conduit and deflecting nose or spout so that, even with a high ventilation effect of the outer drum sleeve as expected with desired high speeds, no mixing will result. After removing the sediment out of the centrifuge the linear drive 87 draws the thrust body 38 via the pulling rod 24 back so that cover 30 is taken by flange 23 and is clamped relative to the free end of the outer drum sleeve 1 so that the centrifuge chamber is tightly closed. Now a new centrifuging cycle can start. A suitable sealing 7, preferably a slide ring sealing with a blocking and cooling liquid closes the process space between the housing 5 and the hollow shaft 10 in connection with suitable connection conduits of the individual intake chambers to the various collecting containers from the environment.

Figure 2:
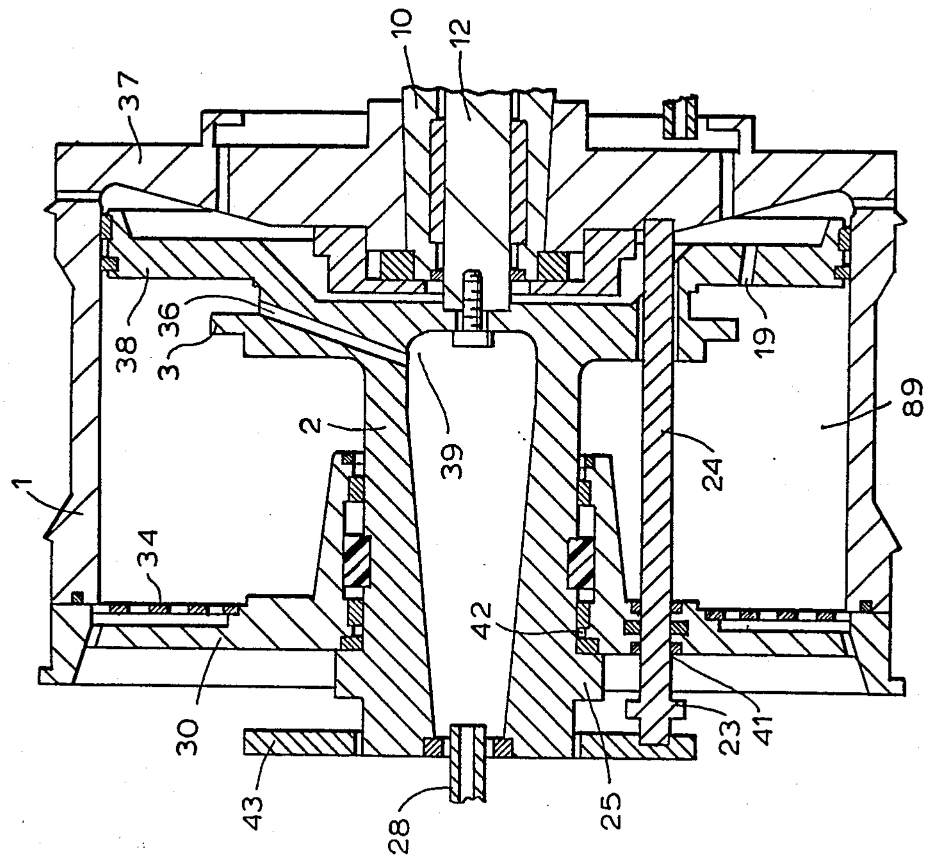
FIG. 2 is a sectional view of a second embodiment of the centrifuge without a housing and support.

FIG. 2 illustrates a further embodiment of the centrifuge according to the invention. FIG. 2 shows the centrifuge with housing 5 and frame 9 omitted from the drawing. The thrust body 38 is rigidly connected with the inner drum sleeve 2. The axially displaceable inner shaft 12 is connected to the thrust body 38. The inner drum sleeve 2, namely its outer periphery serves as a radial, axially displaceable guide for the cover 30. The inner drive sleeve 2 has the flange 25. The pulling rod 24 which has flange 23 is guided via the bore 41 in the cover 30 and is connected to the bottom wall 37 and to a ring 43.

Figure 6:
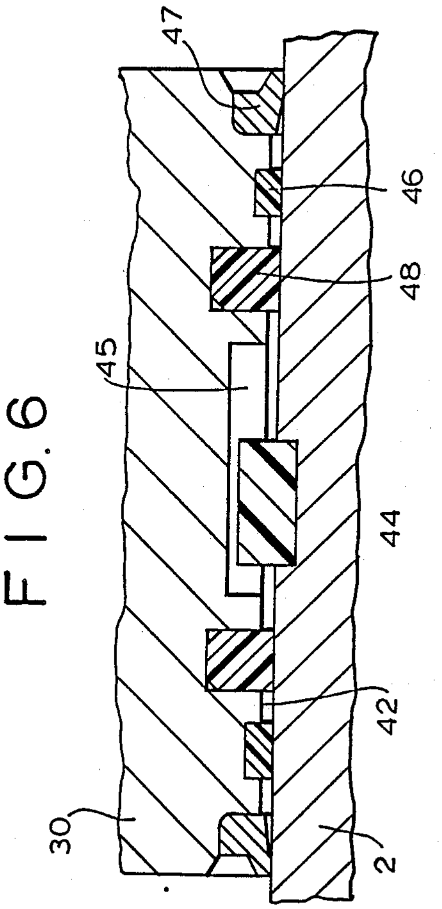
FIG. 6 illustrates the guidance of an inner drum sleeve through a bore in the cover.

The suspension to be separated flows through the feeding tube 28 directly into the interior of the drum sleeve 2 where it is pre-sedimented and pre-centrifuged. Then the suspension flows through the distributing passage 39 and distribution openings 36 into the centrifuge chamber 89 where the suspension is separated from solids as described herein above. During the removal of the sediment from the centrifuge the inner shaft 12 displaces the drum sleeve 2 together with the thrust body 38 in the direction of the free end of the outer drum sleeve 1. If the sufficient amount of the sediment is available in the centrifuge chamber 89 the sediment pushes cover 30 into the open position and the centrifuge is unloaded. On the other hand, the clamping elements with sufficiently high friction properties are provided between the cover and the inner drum sleeve for transporting the cover, as shown in FIG. 6. Cover 30 opens only to some degree unless it abuts against the flange 23. After the centrifuge has been emptied the inner shaft 12 again draws the inner drum sleeve 2 with the thrust body 38 back. The flange 25 engages cover 30 and clamps the same relative to the free end of the outer drum sleeve 1 so that the centrifuge chamber is tightly closed.

Figure 3:
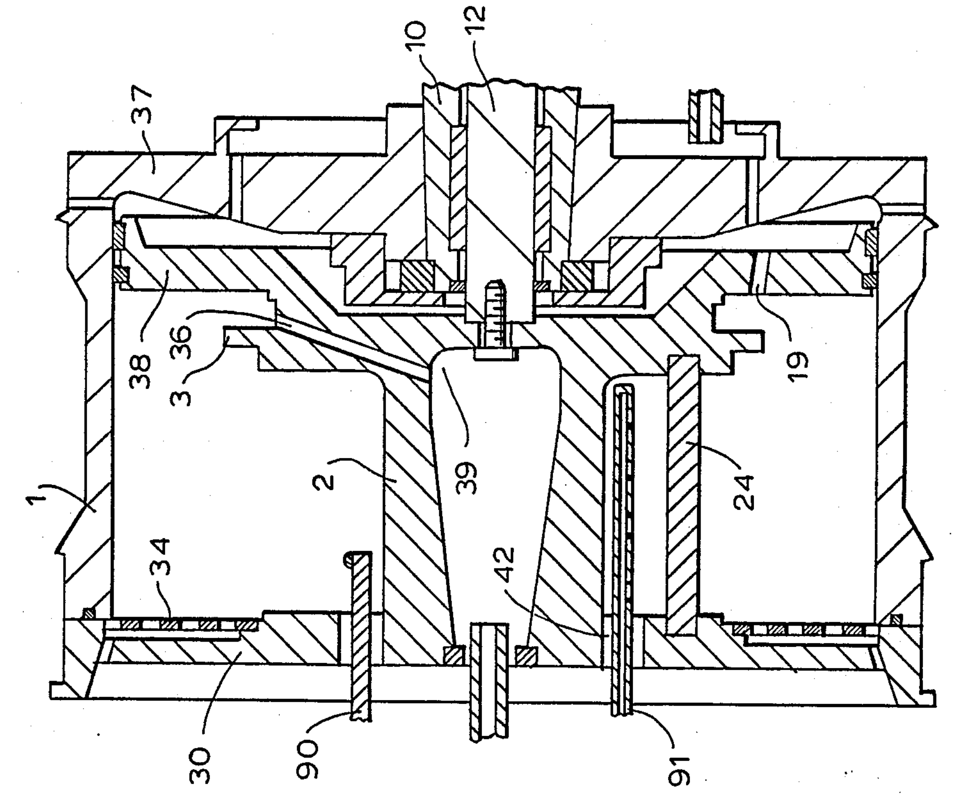
FIG. 3 is a sectional view of a third embodiment of the centrifuge.

FIG. 3 shows yet another embodiment in which the thrust body 38 is connected to the inner drum sleeve 2 and together with the same is secured to the axially displaceable inner shaft 12. The inner drum sleeve 2 is guided via an enlarged bore 42 provided in cover 30. The cover 30 is connected to the thrust body 38 by means of the pulling rods 24 which transmit the forces for closing the cover and fix the cover radially. Upon the movement of the thrust body 38 for unloading the sediment the thrust body 38, the inner drum sleeve 2 and cover 30 are moved together over the same path. Due to an annular gap which is formed now between the cover 30 and the outer periphery of the inner drum sleeve 2, a measuring instrument can be now advantageously inserted from outside and secured inside the centrifuge chamber. This measuring instrument can be preferably an opto-electronic sensor, by means of which the condition of filling of the centrifuge chamber is measured. A tube with nozzles for supplementing liquid particles in the sediment can be inserted through the aforementioned annular gap.

Figure 4:
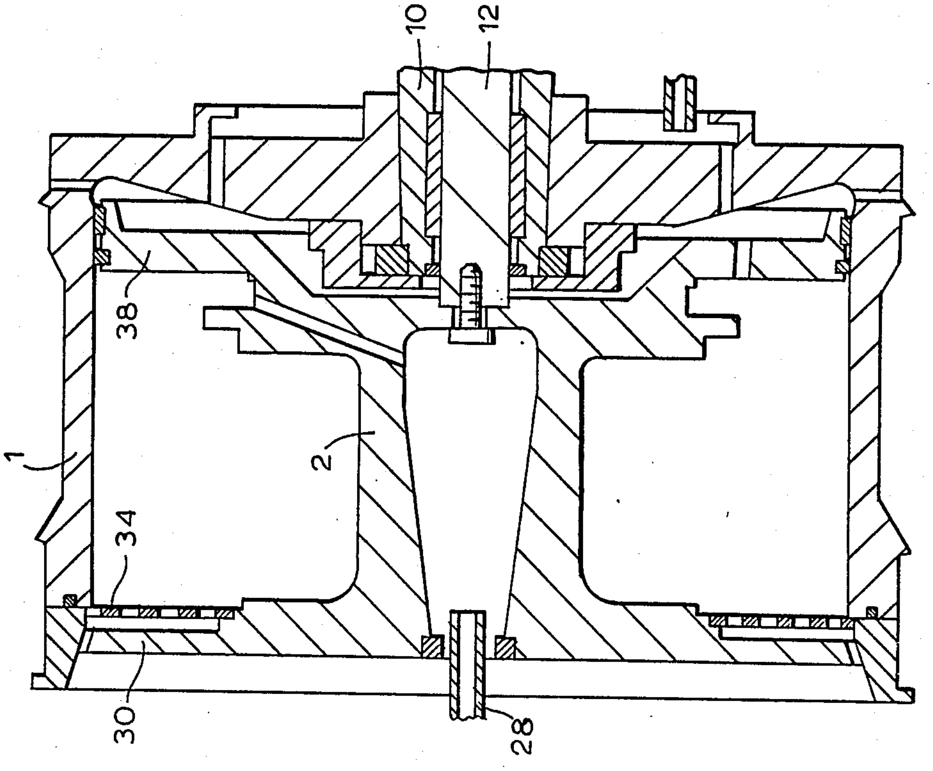
FIG. 4 is a sectional view of a fourth embodiment of the centrifuge of this invention.

FIG. 4 shows still another modification of the invention. The thrust body 38 in this modification as well as the cove 30 are connected to the inner drum sleeve 2 which in turn is connected to the axially displaceable inner shaft 12. When the thrust body 38 is moved for the unloading of the sediment the inner drum sleeve 2, thrust body 38 and cover 30 are shifted together over a common path. This modification provides a specifically advantage ous simple structure.

Figure 5:
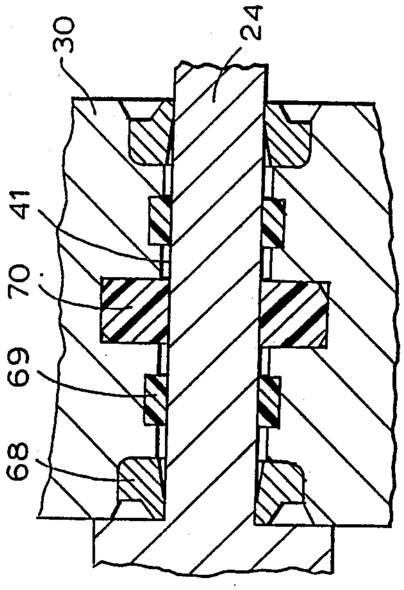
FIG. 5 shows the extension of a pulling rod through a bore in a cover, in a sectional view.

FIG. 5 shows the guidance of the pulling rod 24 through the cover 30. A strip-like element 68, preferably a stripping rod cleans the guided pulling rod 24 from dirt adhered thereto and prevents penetration of the suspension into the bore 41 whereby nests of radiation-active suspensions in the bore 41 will be prevented during the centrifuging. A guide element 69, preferably a guide ring of PTFE, prevents metallic contact between the cover 30 and the pulling rod 24. A clamping element 70, preferably of synthetic plastic material produces required friction for transporting the cover 30 for the opening of the centrifuge chamber when the sediment is to be removed.

FIG. 6 shows a structure of the guidance of the inner drum sleeve 2 through the bore 42 in the cover 30. A stripping element 47, preferably a stripping rod cleans the outer periphery of the inner drum sleeve 2 from the dirt adhered thereto and prevents penetration of suspensions into bore 42 whereby no activity nests of the radiation-active suspensions would occur in the bore 42 during the centrifuging of the suspensions. Guide elements 46, preferably guide rings of PTFE, fix the cover 30 to the inner drum sleeve 2. Clamping elements 48, preferably plastic rings, produce required friction forces for transporting the cover in the same manner as explained for FIG. 2. An element 44 preferably a pass spring is positioned in a groove 45 and, prevents a nonpermissible radial movement of the inner shaft 12.

Figure 7:
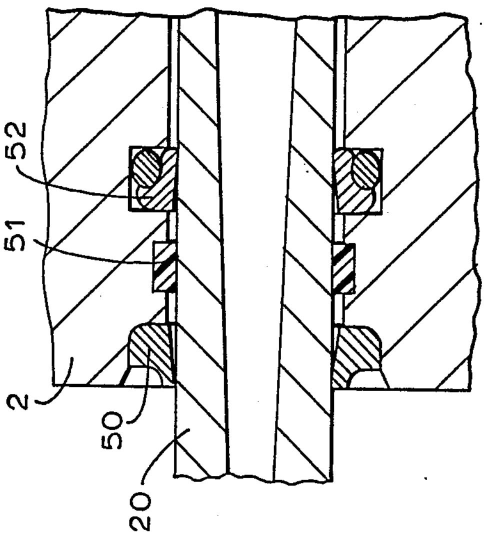
FIG. 7 shows a support of a feeding hopper in a bore of the inner drum sleeve, in a sectional view.

FIG. 7 illustrates in detail a support of the feeding hopper 20 in the bore of the inner drum sleeve 2. A guide element 51, made, preferably as a guide ring of PTFE, provides an inelastic or rigid radial guidance of the feeding hopper 20 with the fully shifted inner shaft 12. A stripping element 50 and a stripping element 52 formed as rings of PTFE prevent penetration of the suspension into the region of the guide element 51 and therefore the formation of the activity nests during the separation of radio-active suspensions.

FIG. 8 illustrates the connection of the filter means 34, preferably a plastic diaphragm, to the cover 30 and a sealing between the cover 30 and the outer drum sleeve 1. The filter means 34 is positioned on a supporting element 73 having openings. Supporting element 73 may be formed as a perforated flat ring which closes a chamber 81 for collecting the filtrate. Chamber 81 is defined in air abutment ring 72 which is secured to cover 30. Chamber 81 is in connection via a bore 74 with an annular groove 75 which lead to the bores provided in cover 30. A seal element 76 is positioned in groove 75.

The filter means 34 is clamped on the abutment ring 72 by means of a clamping ring 82 which has a compensating element 71, preferably an elastic ring of plastic, and a clamping ring 77 which has compensating elements 71 and 78 also formed as elastic rings of plastic. The compensating elements 71 and 78 compensate for thickness differences of the various filter means and enable the clamping of the filter means of various thicknesses adjusted to respective suspensions being treated in the centrifuge. The clamping ring 77 closes the centrifuge chamber with the outer drum sleeve 1. The outer drum sleeve has at the place of contact between the clamping ring 77, a ring 79 and the drum sleeve 1, a sealing element 80, preferably a perfluorized plastic ring which can be interchangeable by the removal of a ring 72. A projection 83 formed at the front edge of the outer drum sleeve 1 prevents the sediment from flowing to the sealing element 80 during the unloading of the centrifuge chamber. During the separation of the suspensions, the solids are held on the filter means 34. The liquid penetrates the filter means and is collected in the chamber 81 from which it escapes through bores 74 and is centrifuged. The structure of the filter means 34 provides a tight, fold-free clamping of the filter means on the ring 72.

Figure 9:
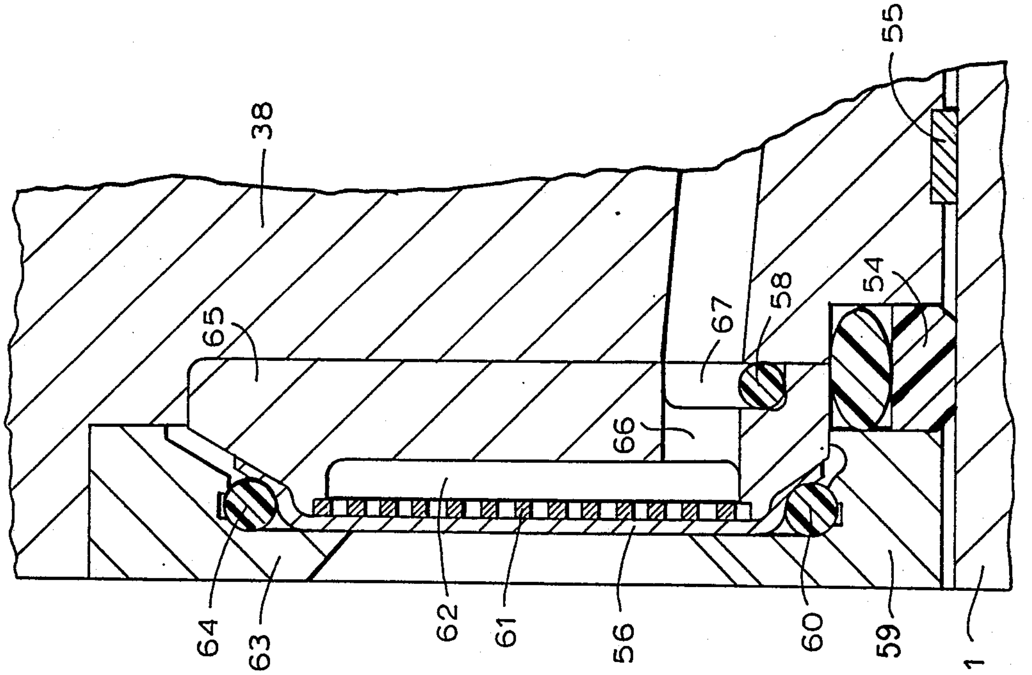
FIG. 9 is a sectional view illustrating the connection of the filter means to a thrust body.

FIG. 9 shows the structure of the connection of a filter means 56 in the thrust body 38 and a sealing between the thrust body 38 and the outer drum sleeve 1. The clamping of the filter means 56 in this embodiment is carried out by various shapes of the clamping ring 59. A compensating element 60 is provided on the filter means 56. Reference number 62 denotes a chamber in a supporting ring 65 on the thrust body 38. A tension ring 63 closes the filter means 56. A compensating ring 64 is placed between rings 63 and 65. 66 is a ring groove which is in connection with a bore 67.The thrust body 38 has an annular groove in which a sealing element 54 is accommodated. Reference numeral 55 designates a guiding element on the thrust body 38. Sealing element may be preferably formed as a hydraulic piston sealing of the material adjusted to the suspension being treated. This sealing, upon the shifting of the sediment, will be displaced with the edge facing the clamping ring 59 to the protruding edge of the outer drum sleeve 1 so that centrifuge chamber is completely emptied from the sediment and the wall of the groove facing the sediment will be freed from the sediment stuck thereto due to centrifugal force. Reference numeral identifies a sealing 58. Reference number 61 identifies a supporting element.

Figure 10:
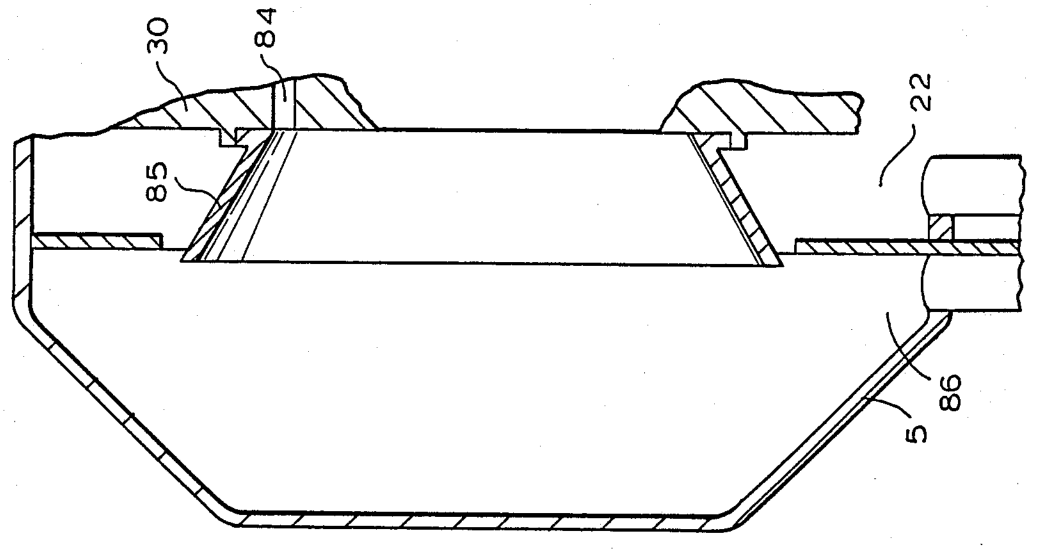
FIG. 10 is a sectional view of an overflow portion of the cover.

FIG. 10 illustrates a modified embodiment of the overflow portion of the centrifuge. Cover 30 in FIG. 10 has a bore 84, through which can overflow portion of the suspension flows. The overflow portion then flows through a conduit ring 85 secured to the cover into the intake chamber 86 without being intermixed with the filtrate separated from the suspension. The overflow portion of the suspension is conveyed from the intake chamber 86 back to the feeding means of the centrifuge.

It will be understood that each of the elements described above, or two or more together, may also find a useful application in other types of clarifying filter-type centrifuges differing from the types described above.

While the invention has been illustrated and described as embodied in a clarifying filter centrifuge, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of filtering a suspension by a clarifying filter-centrifuge having feed means for feeding said suspension to be filtered into said filter-centrifuge; discharge means for discharging a filtrate from said filter-centrifuge; a drum with a cover closing one end thereof driven by a rotatable driving shaft including an outer sleeve having an interior and an inner sleeve also having an interior and being coaxial with said outer sleeve; filter means mounted on said cover and extending normal to an axis of rotation of said shaft; said driving shaft including a hollow shaft and an inner shaft; means for an axial displacement of said inner shaft in said hollow shaft, said drum being connected to said hollow shaft, said feed means feeding said suspension axially into said interior of said inner sleeve; said inner sleeve including means defining a distributing channel communicating with said interior of said inner sleeve; a thrust body mounted in said drum adjacent said inner sleeve being provided with distributing means connecting said distributing channel of said inner sleeve with said interior of said outer sleeve, said distributing means in said thrust body including a means defining a distributing opening and a conduit arrangement in the vicinity of said distributing opening, said distributing opening being positioned between said conduit arrangement and a side of said thrust body facing said cover, the method comprising the steps of:

a. feeding said suspension axially to said interior of said inner sleeve by said feed means;

b. separating and accelerating said suspension in said inner sleeve to precentrifuge and precondense said suspension;

c. flowing said suspension from said inner sleeve through said distributing channel toward said thrust body;

d. flowing said suspension from said distributing channel to said distributing means in said thrust body and through said distributing opening;

e. deflecting said suspension axially in the direction of said filter means via said conduit arrangement to form a suspension liquid; and f. flowing said suspension liquid through said filter means to form said filtrate and discharging said filtrate by said discharge means.

2. The method according to claim 1 further comprising the step of:

g. centrifuging said suspension in said outer sleeve.

* * * * *